United States Patent
Yoon et al.

(10) Patent No.: US 9,257,715 B2
(45) Date of Patent: Feb. 9, 2016

(54) CYLINDRICAL SECONDARY BATTERY

(71) Applicant: SAMSUNG SDI CO., LTD., Yongin-si, Gyeonggi-do (KR)

(72) Inventors: Seok-Joon Yoon, Yongin-si (KR); Kwang-Sik Jeon, Yongin-si (KR); Dae-Kyu Kim, Yongin-si (KR); Sang-Hun Jeong, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/773,077

(22) Filed: Feb. 21, 2013

(65) Prior Publication Data

US 2013/0224545 A1    Aug. 29, 2013

Related U.S. Application Data

(60) Provisional application No. 61/602,973, filed on Feb. 24, 2012.

(51) Int. Cl.

| | |
|---|---|
| *H01M 8/04* | (2006.01) |
| *H01M 10/04* | (2006.01) |
| *H01M 10/052* | (2010.01) |
| *H01M 10/0587* | (2010.01) |
| *H01M 2/02* | (2006.01) |

(52) U.S. Cl.
CPC ........ *H01M 10/0431* (2013.01); *H01M 10/052* (2013.01); *H01M 10/0587* (2013.01); *H01M 2/022* (2013.01); *Y02E 60/122* (2013.01)

(58) Field of Classification Search
CPC ... H01M 2/30; H01M 2/202; H01M 10/0431; H01M 4/64; H01M 4/70; H01M 2/20; H01M 2/266; H01M 6/10
USPC .......................................................... 429/94
See application file for complete search history.

(56) References Cited

U.S. PATENT DOCUMENTS

| | | | |
|---|---|---|---|
| 2003/0148175 A1* | 8/2003 | Iwanaga et al. | 429/130 |
| 2006/0275665 A1 | 12/2006 | Hyung et al. | |
| 2007/0269711 A1* | 11/2007 | Meguro et al. | 429/94 |
| 2011/0086261 A1 | 4/2011 | Chun et al. | |
| 2011/0117397 A1 | 5/2011 | Choi et al. | |

FOREIGN PATENT DOCUMENTS

| | | |
|---|---|---|
| JP | 08-250155 A | 9/1996 |
| JP | 08-255631 A | 10/1996 |
| KR | 10-2006-0102749 A | 9/2006 |

* cited by examiner

*Primary Examiner* — Cynthia H Kelly
*Assistant Examiner* — Monique Wills
(74) *Attorney, Agent, or Firm* — Robert E. Bushnell, Esq.

(57) ABSTRACT

The present invention provides a cylindrical secondary electrode including a first electrode plate, a second electrode plate, a separator interposed between the first electrode plate and the second electrode plate, and a case having a space for receiving the electrode assembly, wherein the cylindrical secondary electrode may include a core element having a space at the center thereof and having a tubular shape with a circular cross section, which is inserted into a space at the center of an electrode assembly and has at least one slit including a bent portion.

17 Claims, 7 Drawing Sheets

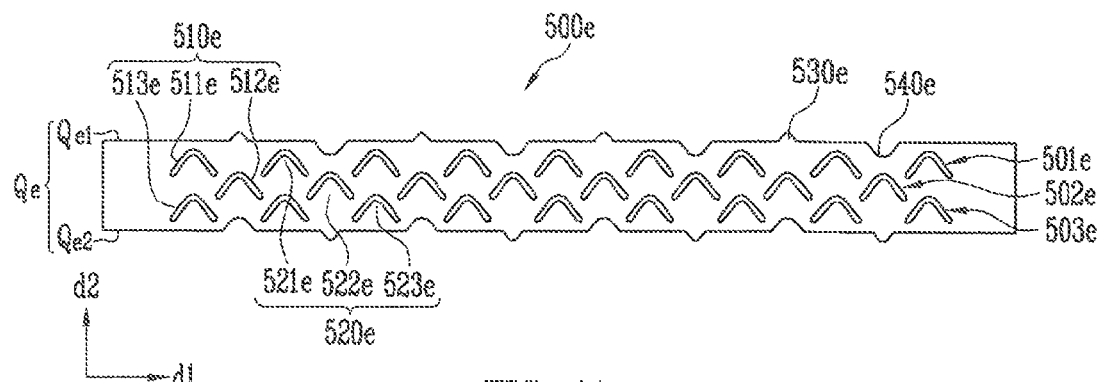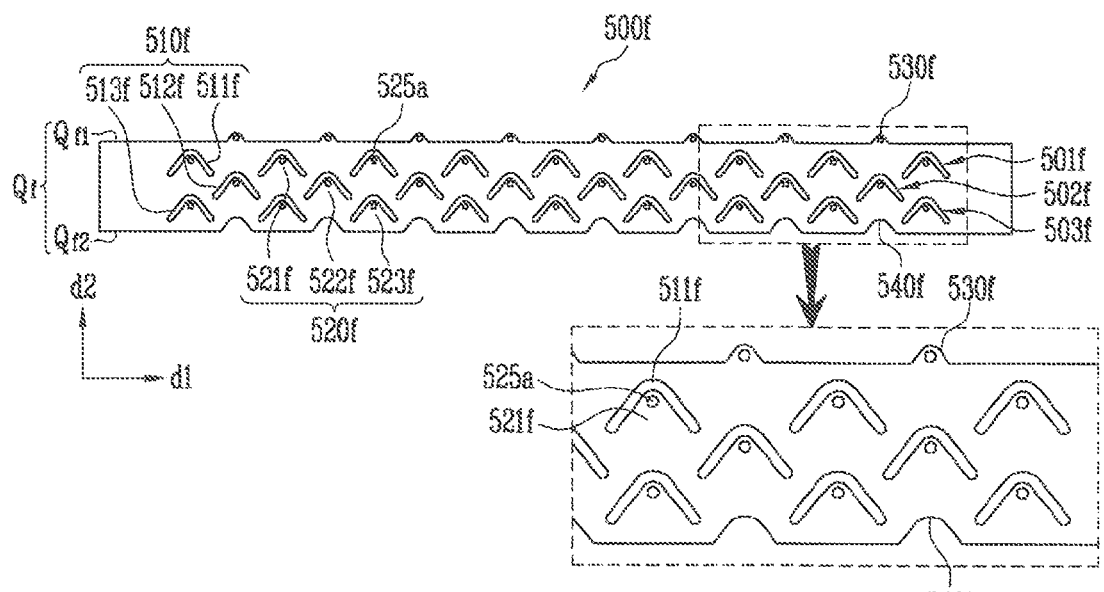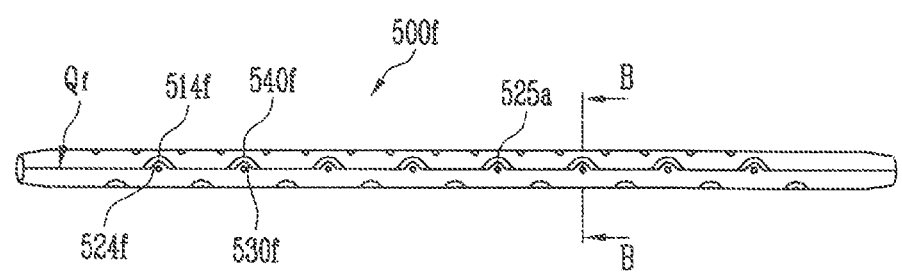

CYLINDRICAL SECONDARY BATTERY

CROSS-REFERENCE TO RELATED APPLICATION

This application claims priority under 35 U.S.C. §119(e) to U.S. Provisional Application No. 61/602,973, filed 24 Feb. 2012, which is herein incorporated by reference in its entirety.

BACKGROUND OF THE INVENTION

1. Field of the Invention

The present invention relates to a cylindrical secondary battery, more particularly, to a cylindrical secondary battery to ensure safety when pressure is applied to the battery by an external impact.

2. Description of the Related Art

Generally, a cylindrical lithium ion secondary electrode includes an electrode assembly that is wound in an approximately cylindrical shape, a cylindrically-shaped can coupled to the electrode assembly, an electrolyte injected into an inner side of the can to transport the lithium ions, and a cap assembly coupled to one side of the can to prevent leakage of the electrolyte and disengagement of the electrode assembly.

Since such cylindrical lithium ion secondary electrodes generally have a capacity of 2000~2400 mA, they are mainly used for notebook computers, digital cameras and camcorders, and the like, which need high-capacity power.

In one example, one such cylindrical lithium ion secondary electrode is connected in serial-parallel because the electrode requires many cells and is assembled in a hard pack of predetermined shape to be coupled to an electronic device to be used as a power supply.

The cylindrical secondary electrode includes a positive electrode plate coated with a positive active material, a negative electrode plate coated with a negative active material, an electrode assembly disposed between the positive electrode plate and the negative electrode plate having a separator wound in an approximately cylindrical shape for transporting lithium ions (Li-ion), a cylindrical case for receiving the electrode assembly, and an electrolyte injected into the cylindrical case for transporting lithium ions.

Generally, in such cylindrical secondary electrodes, a space exists in a center portion of the electrode assembly.

A problem associated with said space is that it provides for annealing and deformation of the electrode assembly.

Therefore, an attempt to solve this problem has been made by combining a tubular core element having a cut-off groove approximately formed along a longitudinal direction with the center space of the electrode assembly.

However, pressure may be applied to the core element by an external impact, for example, by dropping the cylindrical secondary electrode.

When the core element is subject to deformation by compression under pressure, a tip end of the cut portion stabs the electrode assembly.

In particular, when the core element is deformed or damaged, the separator of the electrode assembly is damaged. Puncture of the separator causes a short between the positive electrode plate and the negative electrode plate. Therefore, there are fatal problems in that the cylindrical secondary electrode may be destroyed or may explode.

As result, it has a serious influence on the lithium battery.

SUMMARY OF THE INVENTION

An object of the present invention is to overcome prior problems, wherein the present invention provides a safer cylindrical secondary electrode with a core element causing an internal short of an electrode assembly when pressure is applied by an external impact.

In order to achieve the above-mentioned object of the present invention, the cylindrical secondary electrode may include a first electrode plate, a second electrode plate, a separator interposed between the first electrode plate and the second electrode plate, and a case having a space for receiving the electrode assembly, wherein the cylindrical secondary electrode may include a core element having a predetermined space at a center thereof and having a tubular shape with a cross section that is circular, which is inserted into a space at the center of an electrode assembly and has at least one slit pattern with a bent portion. The core element may be round rolled to be tubular based on a seam. That is, the secondary battery may comprise a core element having a bore defining a longitudinal axis surrounded by a peripheral surface perforated by an arrayed plurality of slits, each comprising a bent portion, and an electrode assembly formed wound around said peripheral surface of said core coaxially with said longitudinal axis.

The difference in length between an uppermost portion and a lowermost portion of the bent portion is in the range of about 1 mm to about 2 mm, and the difference in length of the bent portion of the lowermost portion and the uppermost bent portion may be in the range of about 120% to about 140% of the distance between the electrode assembly and the core element.

The slits may be arranged in a first direction, the bent portion having a concave shape with a concavity facing a second direction, wherein the first direction defines a longitudinal direction of the core element and the second direction is perpendicular to the first direction.

The slit pattern may include a first slit pattern arranged in a first column along a first direction of the core element and a second slit pattern neighbor on the first column and arranged in a second column having a predetermined interval.

The bent portion may include a first bent portion arranged in a first column along a first direction of the core member and a second bent portion neighbor on the first column and arranged in a second column having a predetermined interval.

The second slit pattern arranged in the second column may be disposed between the first slit pattern's neighbor on the first column. The slits in adjacent rows or columns may be arranged in a staggered pattern.

The second slit pattern arranged in the second column may be disposed in parallel to the first slit pattern of the first column. The slits may be spaced at substantially regular intervals, with the slits in each successive row being disposed substantially directly under each other in generally regular columns.

The second slit pattern of the second column may be formed in parallel to the first slit pattern of the first column so that the second bent portion could be arranged in parallel in a second direction perpendicular to the first direction of the first bent portion and the core member.

The second slit pattern of the second column may be formed in a 180° symmetric relationship with the first slit pattern of the first column so that the second bent portion is inconsistently arranged in the second direction perpendicular to the first direction of the first bent portion and the core member. The slits may include at least two rows of slits spaced at substantially regular intervals, wherein the slits in each successive row are arranged substantially directly under each other in substantially regular columns, and wherein the slits in each successive column are oriented 180° with respect to the slits in each adjoining column.

The first direction may be a longitudinal direction of the core member, and the second direction may be a circumferential direction of the core member.

The slits may include at least two rows of slits spaced at substantially regular intervals, wherein the slits in each successive row are arranged substantially directly under each other in substantially regular columns, and wherein the slits in each successive column are oriented 180° with respect to the slits in each adjoining column.

Supposing that one side is a first end portion and the other is a second end portion based on the seam, the first end portion may be provided with a convex portion and the second end portion may be provided with a concave portion. The concave or convex portions may be multi-stage.

The first end portion may be alternatively provided with the convex portion and the concave portion.

The bent portion may further include a concave portion. The concave portion is provided to protrude toward an inner side that is a center direction of the core member.

The concave portion may have a hemispherical shape or cone shape.

The bent portion may have a hemispherical shape, an oval shape or a polygon shape.

The slits may have at least two rows of slits spaced at substantially regular intervals, wherein the slits in each successive row are arranged substantially directly under each other in substantially regular columns, and wherein the slits in each successive column are oriented 180° with respect to the slits in each adjoining column.

It is preferable that the slit pattern include a least two columns.

BRIEF DESCRIPTION OF THE DRAWINGS

FIGS. 3A to 3E are plan views showing a core member according to first to fifth embodiments of the present invention.

FIG. 4A is a plan view showing a core member according to a sixth embodiment of the present invention.

FIG. 4B is a perspective view forming a core in a tubular shape of FIG. 4A.

DETAILED DESCRIPTION OF THE INVENTION

In the following detailed description, only certain exemplary embodiments of the present invention have been shown and described, simply by way of illustration.

An embodiment of the present disclosure will be described with reference to accompanying drawings in detail.

Figure 1A:
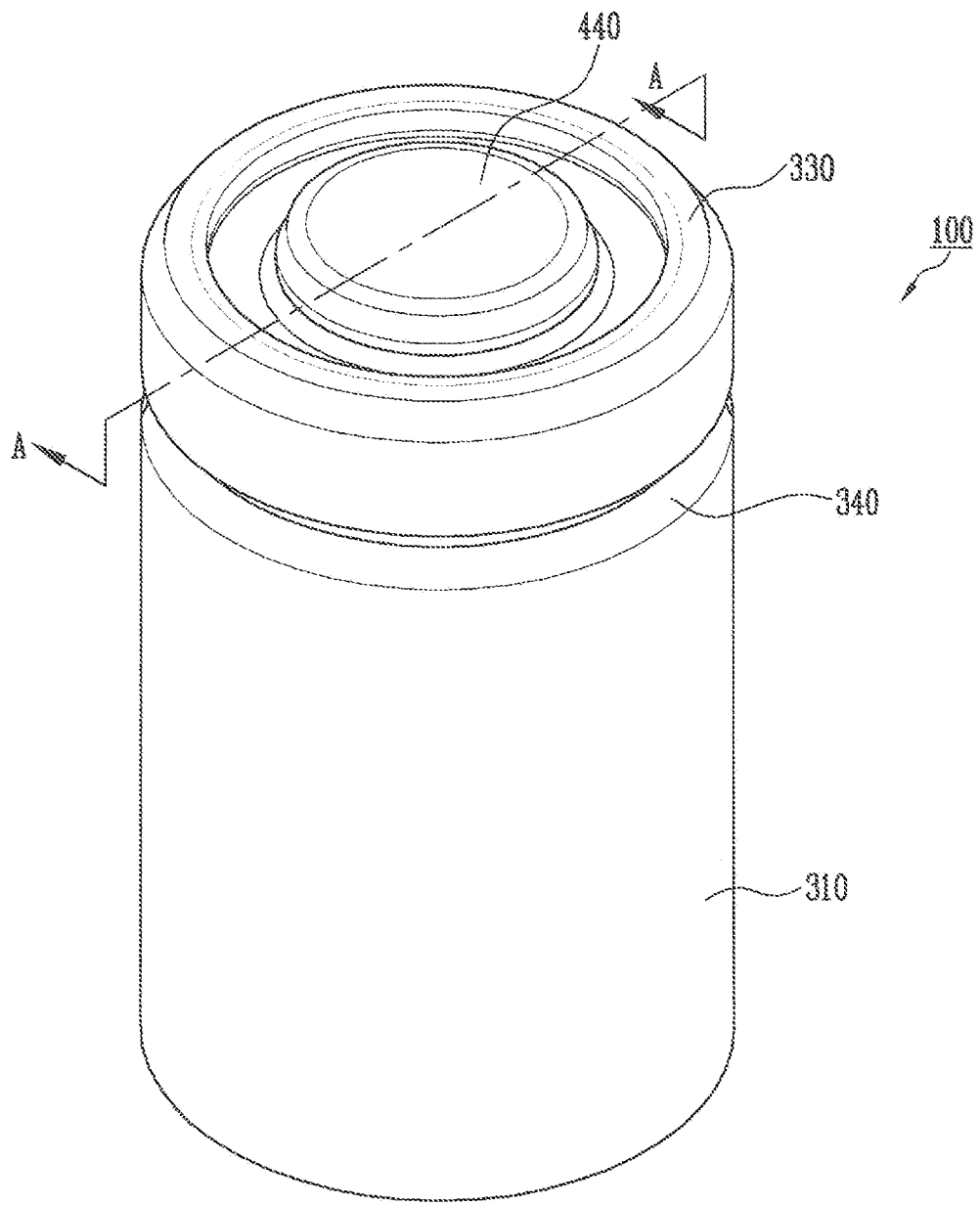
FIG. 1A is a perspective view showing a cylindrical secondary electrode according to an embodiment of the present invention.
Figure 1B:
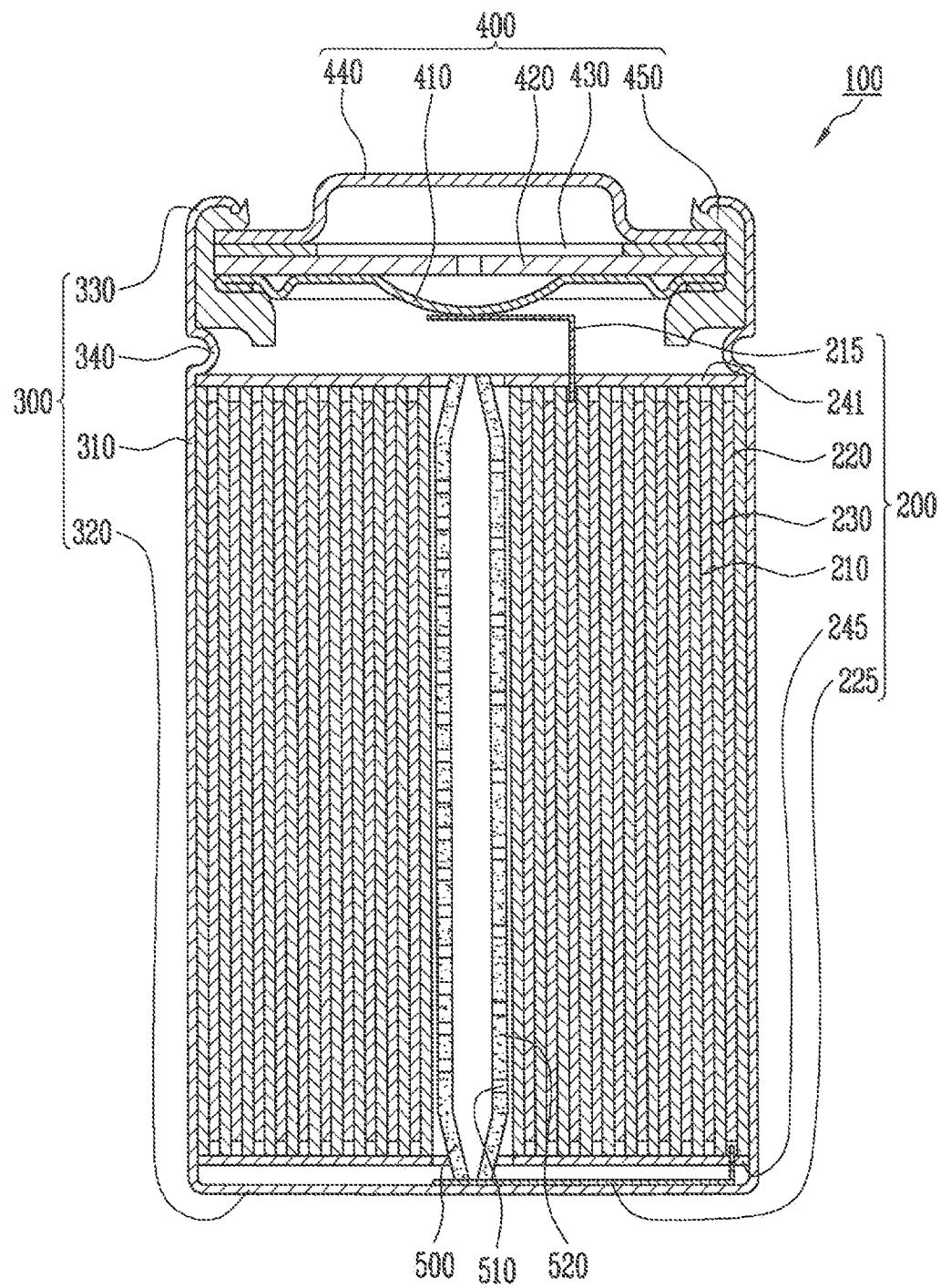
FIG. 1B is a cross-sectional view according to line A-A of FIG. 1A.

FIG. 1A is a perspective view showing a cylindrical secondary electrode according to an embodiment of the present invention, and FIG. 1B is a cross-sectional view according to line A-A of FIG. 1A.

Referring to FIGS. 1A and 1B, a cylindrical secondary electrode 100 includes an electrode assembly for generating a voltage difference at charging and discharging, a cylindrical case 300 for receiving the electrode assembly and a core element 500 disposed in a space of the center portion of the electrode assembly.

The core element 500 is placed in a space at the center portion of the electrode assembly. The top of cylindrical case 300 is provided with a cap assembly 400 for assembling the cylindrical case 300 and preventing movement of the electrode assembly 200.

The electrode assembly 200 is disposed between any one of a positive active material and a negative active material, for example, a first electrode plate 210 coated with a positive active material, any other of the positive active material and the negative active material coated, for example, a second electrode plate 220 coated with a negative active material, and a separator 230 disposed between the first electrode plate 210 and the second electrode 220, preventing a short of the first electrode plate 210 and the secondary electrode plate 220 and transporting lithium ions.

In addition, the first electrode plate 210, the second electrode plate 220 and the separator 230 are wound in an approximately circular shape to fit the cylindrical case 300.

The first electrode plate 210 is generally made of aluminum (Al) material and joins a first electrode tab 215 protruding toward the top thereof in a predetermined length.

The second electrode plate 220 is generally made of nickel (Ni) material and joins a second electrode tab 225 protruding toward a lower portion in a predetermined length, but the materials of the first electrode 210 and the second electrode plate 220 are not limited thereto.

In addition, the upper and lower portions of the electrode assembly 200 are further attached to an upper insulating plate 241 and lower insulating plate 245 in order to avoid contact with the direct cap assembly 400 or cylindrical case 300.

The cylindrical case 300 has a predetermined space and forms a circular surface 310 having a predetermined diameter. A lower portion of the circular surface 310 is formed with a lower surface 320 blocking the lower portion of the circular surface 310 and the upper portion of the circular surface 310 is opened to insert the electrode assembly 200.

Meanwhile, the cylindrical case 300 itself serves as the same electrode such as the second electrode plate 220, for example, the negative terminal.

In addition, the cylindrical case 300 is generally made of aluminum (Al), iron (Fe) or an alloy thereof.

In addition, the cylindrical case 300 is formed with a crimping section 330 bent toward one side by compressing the cap assembly 400 in the upper portion thereof, and is formed with an inwardly recessed beading section 340 by compressing the cap assembly 400 in an upward direction in a lower portion thereof.

The cap assembly 400 includes a conductive safety vent 410 welded to the first electrode tab 215 of which type is reversed on overcharging or overheating, a printed circuit board (PCB) 420 connected electrically and mechanically to the top of the conductive safety vent 410 and short-circuited when the safety vent 410 is reversed, a positive temperature coefficient 430 connected electrically and mechanically to the top of the printed circuit board 420 and short-circuited above a predetermined temperature, a conductive electrode cap 440 connected electrically and mechanically to the top of the positive temperature coefficient 430 to apply actual current to the outside, and an insulating gasket 450 circumferentially surrounding the safety vent 410, the printed circuit board 420, the positive temperature coefficient 430 and the electrode cap and isolating the elements from cylindrical case 300.

In this case, any one of the first electrode tab 215 and the second electrode tab 225, for example, the first electrode tab 215, is joined to the electrode cap 440. Thus, the electrode cap serves the same function as the first electrode plate, for example, a positive terminal.

The core element 500 is inserted into a space at the center of the Jelly-roll electrode assembly 200 to prevent the Jelly-roll electrode assembly 200 from moving and to prevent the Jelly-roll electrode assembly from being deformed.

Such a core element 500 is formed as a metal material tube having a circular cross-section, and is approximately rod-shaped.

In addition, the core element 500 is formed with the slit pattern 510 so that a portion of the metal material tube can have a bent portion.

In addition, the core element 500 is formed at about 90% to about 110% of the height of the electrode assembly 200, and the lower end is located on the second electrode tab 225.

If the height of the core element 500 is below 90% of the height of the electrode assembly, the force fixing and supporting the electrode assembly 200 is too weak, and if it is above 110%, the height is not preferable because the core element contacts a component of the cap assembly 300.

Meanwhile, although not shown in the drawings, an electrolyte is injected into the cylindrical case 300 to transport lithium ions into a gap of the electrode assembly 200.

The electrolyte serves as a transport medium for lithium ions (Li ion) produced by an electro-chemical reaction in the positive and negative pole on charging and discharging, and the electrolyte may be a non-aqueous system organic electrolyte comprising a mixture of lithium salts in high-purity organic solvents. In addition, the electrolyte may be a polymer using a polymer electrolyte, but is not limited thereto.

Figure 2A:
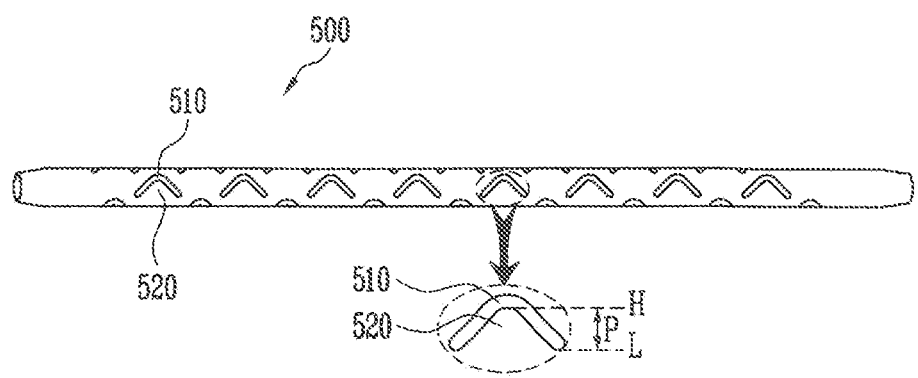
FIGS. 2A and 2B are perspective views showing a cylindrical secondary electrode according to an embodiment of the present invention.
Figure 2B:
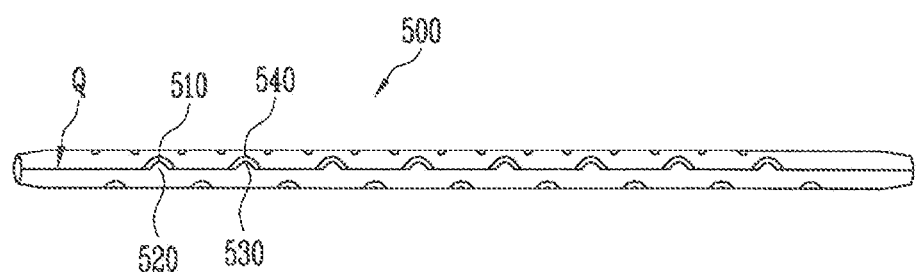

FIGS. 2A and 2B are perspective views showing a core element of a cylindrical secondary electrode according to an embodiment of the present invention.

Referring to FIGS. 2A and 2B, a core element 500 according to an embodiment of the present invention has a tubular shape having a circular cross section and is inserted into a space at a center of the electrode assembly 200. At least one slit pattern 510 is formed in at least a portion of the core element to form a bent portion 520.

Herein, a maximum height p of the bent portion 520, that is, a difference in length between a uppermost portion H and a lowermost portion L, is in the range of about 1 mm to about 2 mm and may be in the about 120% to about 140% range of the distance between the electrode assembly 200 and the core element 500.

A portion of the core element is formed with the slit pattern 510 and the bent portion 520 adjacent to the slit pattern 510. Thereby, the bent portion 520 protrudes by pressure or compressive force when a deformation such as compression occurs by application of pressure to the core element 500 due to an external impact such as dropping of the cylindrical secondary electrode 100. In this case, the portion adjacent to the core element 500 of the electrode assembly 200 contacts a protruding bent portion 520 to be punctured. This causes an internal short.

According to an embodiment of the present invention, a protruding section of the bent section 520 protrudes in a direction perpendicular to a pressure or compressive force, or is close to the level and a protrusion length can be controlled in the range of about 1 mm to about 2 mm which can destroy a portion adjacent to the core element 500 of the electrode assembly or in the range of about 120% to about 140% of a distance between the electrode assembly 200 and the core element 500. Therefore, even if the size of the compressive force is very large, an internal short may occur prior to explosion while keeping a sharp portion which destroys the portion adjacent to the core element 500 of the electrode assembly 200, thereby ensuring the safety of the cylindrical secondary electrode 100.

Herein, the core element 500 is round rolled up to be tubular based on the seam Q.

Supposing that one side is a first end portion and the other is a second portion based on the seam Q, the first end portion is formed with a convex portion 530 and a second end portion is formed with a concave portion 540 corresponding to the convex portion 530.

Thereafter, the core element 500 is provided with the slit pattern 510 and the bent portion 520 based on the seam Q. In the embodiments of the present invention, the bent portion 520 may be a semi-circular shape, but it is not limited thereto. For example, the bent portion 520 may be a polygonal shape.

In an embodiment described below, a first direction defines a longitudinal direction of the core element and a second direction defines a circumferential direction of the core perpendicular to the first direction.

FIGS. 3A to 3E are plan views showing a core element according to first to fifth embodiments of the present invention.

Figure 3A:
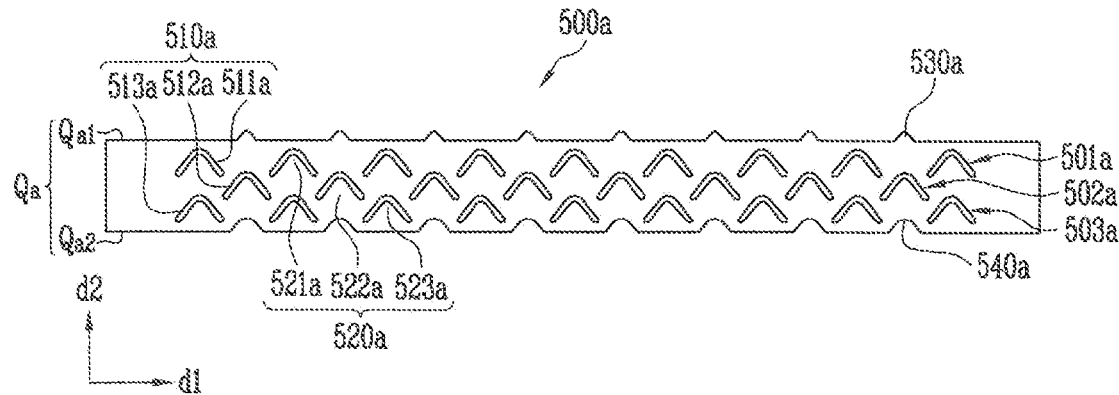

Referring to FIG. 3A, a slit pattern 510a according to a first embodiment of the present invention includes a 4-slit pattern, that is, a first slit pattern 511a arranged in a first column 501a along a first direction d1 of the core element 500a, a second slit pattern 512a neighbor on the first slit pattern 511a and arranged in a second column 502a keeping a predetermined interval, a third slit pattern 513a arranged in third column 503a, and others (not shown) formed by a concave portion 540a and convex portion 530a based on a seam Qa as the slit pattern 510 is formed based on the seam Q of FIG. 2B.

As described above, as the slit pattern is formed, the first bent portion 521a is formed in a position at which a first slit pattern is formed, a second bent portion 522a is formed in a position at which a second pattern is formed, and a third bent portion 523a is formed in a position at which a third pattern is formed. Another bent portion (not shown) may be formed by a convex portion 530a and a concave portion 540a.

The first end portion Qa1 is formed with the convex portion 530a based on the seam Qa of the core element 500a and the second end portion Qa2 is formed with the concave portion 540a corresponding to the convex portion 530a.

Thereafter, the core element is rolled out in a tubular shape, and the core element 500a is provided with another slit pattern and bent portion based on the seam Qa as the slit pattern 510 is formed at center of the seam Q of FIG. 2B.

Here, since another slit pattern and the bent portion do not completely correspond to the concave portion 540a and the convex portion 530a, when the concave portion 540a and the convex portion 530a are rolled out in a tubular shape, a gap is generated between the concave portion 540a and the convex portion 530a. As described above, in this embodiment the slit pattern 510a is composed of at least four. This is why even if the core element 500a is compressed in any direction when the cylindrical secondary electrode 100 is impacted or compressed, there should be a bent portion 520a which always protrudes toward the core element 500a.

Here, the second slit pattern 512a of the second column 502a is formed between the neighbor of slit pattern 511a on a first column 501a, a third slit pattern 513a of a third column 503a is formed between a neighbor of second slit pattern 512a on a second column 502a, the first slit pattern 511a and a bent portion 521a are displaced from an adjacent second slit pattern 512a and a second bent portion 522a, and a third slit pattern 513a and third bent portion 523a are displaced from an adjacent second slit pattern 512a and a second bent portion 522a.

Figure 3B:
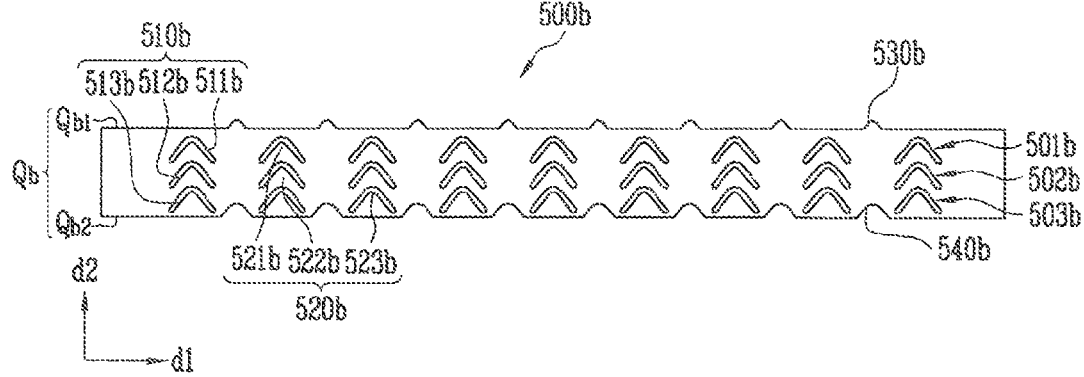

Referring to FIG. 3B, a slit pattern 510b according to a first embodiment of the present invention includes a 4-slit pattern, that is, a first slit pattern 511b arranged in a first column 501b along a first direction d1 of the core element 500b, a second slit pattern 512b neighbor on the first slit pattern 511b and arranged in a second column 502b keeping a predetermined interval, a third slit pattern 513b arranged in third column 503b, and others (not shown) formed by a concave portion 540b and convex portion 530b based on a seam Q as the slit pattern 510 is formed based on the seam Q4 of FIG. 2B.

Here, the second slit pattern 512b of the second column 502b is formed in parallel with the first slit pattern 511b of the first column 501b, the third slit pattern 513b of the third column 503b is formed in parallel with the second slit pattern 512b of the second column 502b, the first slit pattern 511b and the first bent portion 521b are formed in parallel with an adjacent second slit pattern 512b and the second bent portion 522b, and the third slit pattern 513b and the third bent portion 523b are formed in parallel with an adjacent second slit pattern 512b and the second bent portion 522b, that is, are formed in the same direction as a second direction perpendicular to the first direction of the core element 500b.

In a core element according to a second embodiment, as in the first embodiment, the first end portion (Qb1) is formed with the convex portion 530b and the second end portion Qb2 is formed with the concave portion 540b corresponding to the convex portion 530b.

Thereafter, the core element is rolled out in a tubular shape, and the core element 500b is provided with another slit pattern and bent portion based on the seam Qb as the slit pattern 510 is formed at the center of the seam Q of FIG. 2B.

Figure 3C:
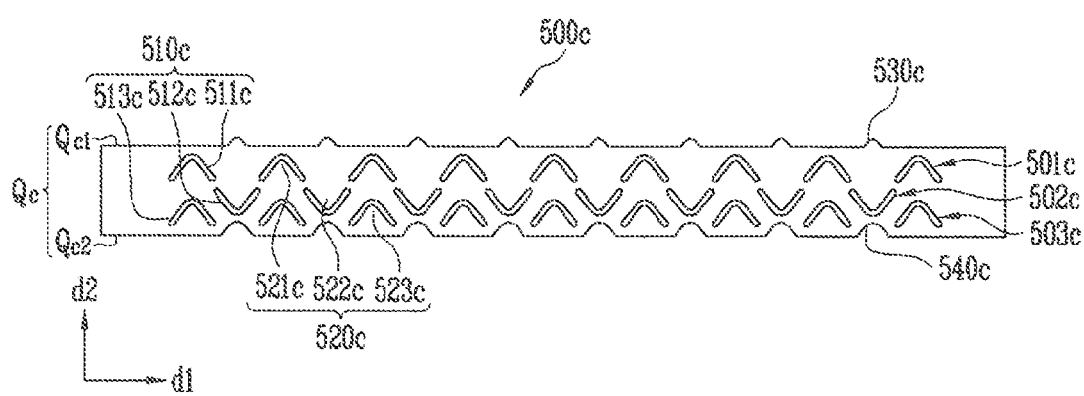

Referring to FIG. 3C, a slit pattern 510c according to a third embodiment of the present invention includes a 4-slit pattern, that is, a first slit pattern 511c arranged in a first column 501c along a first direction d1 of the core element 500c, a second slit pattern 512c neighbor on the first slit pattern 511c and arranged in a second column 502c keeping a predetermined interval, a third slit pattern 513c arranged in third column 503c, and others (not shown) formed by a concave portion 540c and convex portion 530c based on a seam Qc as the slit pattern 510 is formed based on the seam Q of FIG. 2B.

Here, as in the first embodiment, the second slit pattern 512c of the second column 502c is formed between the adjacent first slit pattern 511c of the first column 501c, and the third slit pattern 513c of the third column 503c is formed between adjacent second slit pattern 512c of the second column 502c. Thus, the first slit pattern 511c and the first bent portion 521c are displaced from adjacent second slit pattern 512c and the second bent portion 522c.

According to a third embodiment, the second slit pattern 512c of the second column 502c is in a 180° symmetrical relationship with the first slit pattern 511c of the first column 501c so that the second bent portion 522c is arranged to deviate from a direction perpendicular to the first direction of the core element.

In a core element according to a third embodiment, as in the first embodiment, the first end portion (Qc1) is formed with the convex portion 530c and the second end portion Qc2 is formed with the concave portion 540c corresponding to the convex portion 530c.

Thereafter, the core element is rolled out in a tubular shape, and the core element 500c is provided with another slit pattern (not shown) and bent portion (not shown) based on the seam Qc as the slit pattern 510 is formed at the center of the seam Q of FIG. 2B.

Figure 3D:
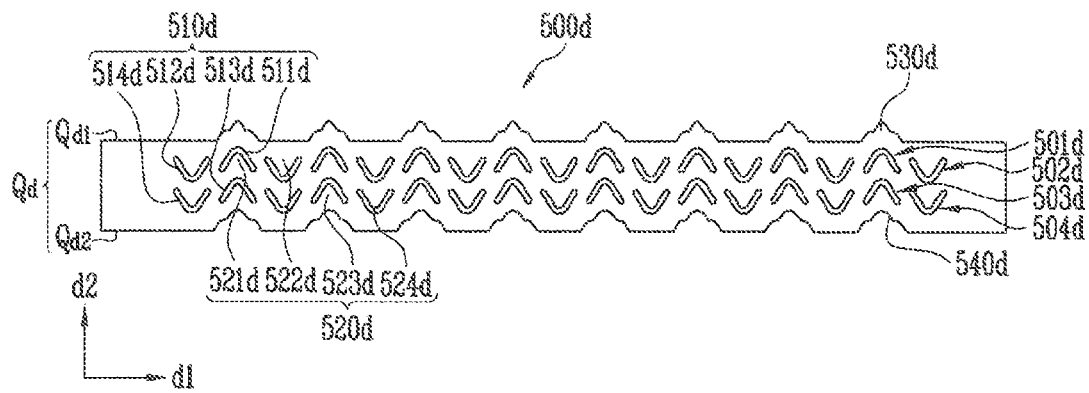

Referring to FIG. 3D, a slit pattern 510d according to a fourth embodiment of the present invention includes a 5-slit pattern, that is, a first slit pattern 511d arranged in a first column 501d along a first direction d1 of the core element 500d, a second slit pattern 512d neighbor on the first slit pattern 511d and arranged in a second column 502d keeping a predetermined interval, a third slit pattern 513d arranged in third column 503d, and others (not shown) formed by a concave portion 540d and convex portion 530d based on a seam Qd as the slit pattern 510 is formed based on the seam Q of FIG. 2B.

Here, the second slit pattern 512d of the second column 502d is formed between the adjacent first slit pattern 511d of the first column 501d, the third slit pattern 513d of the third column 503d is formed between an adjacent second slit pattern 512d of the second column 502d, and the fourth slit pattern 514d of the fourth column 504d is formed between third slit pattern 513d of the third column 503d.

The slit pattern 511d and the first bent portion 521d are displaced from an adjacent second slit pattern 512d and the second bent portion 522d, the third slit pattern 513d and the third bent portion 523d are displaced from an adjacent second slit pattern 512d and the second bent portion 522d and the fourth slit pattern 514d and the fourth bent portion 524d are displaced from an adjacent third slit pattern 513d and the third bent portion 523d.

According to a fourth embodiment of the present invention, the second slit pattern 512d of the second column 502d and the fourth slit pattern 514d of the fourth column 504d are formed to be in a 180° symmetrical relationship with the first slit pattern 511d of the first column 501d and the third slit pattern 513d of the third column 503d so that the second bent portion 522d and the fourth bent portion 524d can be arranged to deviate from the first bent portion 521d and the third bent portion 523d in a second direction d2 perpendicular to the first direction d1 of the core element 500d.

The first end portion Qd1 is formed with the convex portion 530d based on the seam Qd of the core element 500d and the second end portion Qd2 is formed with the concave portion 540d corresponding to the convex portion 530d.

Thereafter, the core element 500d is rolled out in a tubular shape, and the core element 500d is provided with another slit pattern (not shown) and bent portion (not shown) formed based on the seam Qd as the slit pattern 510 is formed at the center of the seam Q of FIG. 2B. The convex portion 503d according to a fourth embodiment of the present invention and the concave portion 540d corresponding thereto are formed as multi-stages differently than in the first to third embodiments.

Referring to FIG. 3E, a slit pattern 510e according to a fifth embodiment of the present invention includes a 4-slit pattern, that is, a first slit pattern 511e arranged in a first column 501e along a first direction d1 of the core element 500e, a second slit pattern 512e neighbor on the first slit pattern 511e and arranged in a second column 502e keeping a predetermined interval, a third slit pattern 513e arranged in third column 503e, and other slit patterns formed by a concave portion 540e and a convex portion 530e based on a seam Qe as the slit pattern 510 is formed based on the seam Q of FIG. 2B.

Here, as in the first embodiment, the second slit pattern 512e of the second column 502e is formed between the adjacent first slit pattern 511e of the first column 501e, and the third slit pattern 513e of the third column 503e is formed between adjacent second slit pattern 512e of the second column 502e. Thus, the first slit pattern 511e and the first bent portion 521e are displaced from adjacent second slit pattern 512e and the second bent portion 522e.

As in the first to fourth embodiments of the present invention, the convex portion 530e and the concave portion 540e are formed even in the core element 500e according to a fifth embodiment based on the seam Qe.

However, unlike in previous embodiments, the concave portion 540e and the concave portion 530e are alternatively formed at the first end portion Qe1 and the second end portion Qe2 based on the seam Qe.

Thereafter, the core element 500e is rolled out in a tubular shape, and the core element 500e is provided with another slit pattern (not shown) and bent portion (not shown) formed based on the seam Qe as the slit pattern 510 is formed at the center of the seam Q of FIG. 2B.

Figure 4C:
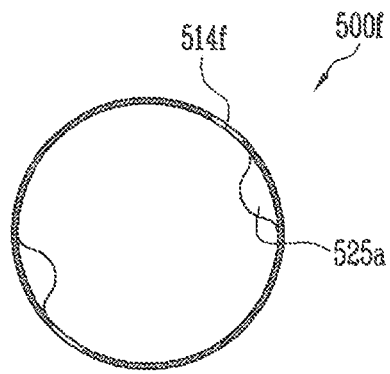
FIG. 4C is a cross-sectional view taken along line B-B.

FIG. 4A is a plan view showing a core element according to a sixth embodiment of the present invention. FIG. 4B is a perspective view showing a core element as a tubular shape and FIG. 4C is a cross-sectional view according to B-B of FIG. 4B.

Referring to FIGS. 4A to 4C, a slit pattern 510f according to a sixth embodiment of the present invention includes a 4-slit pattern, that is, a first slit pattern 511f arranged in a first column 501f along a first direction d1 of the core element 500f, a second slit pattern 512f neighbor on the first slit pattern 511f and arranged in a second column 502f keeping a predetermined interval, a third slit pattern 513f arranged in third column 503f, and other slit patterns formed by a concave portion 540f and convex portion 530f based on a seam Qf as the slit pattern 510 is formed based on the seam Q of FIG. 2B.

As described above, in the core element 500f, as the slit pattern 510f is formed, a first bent portion 511f is formed in a position at which a first slit pattern 511f is formed, a second bent portion 522f is formed in a position at which a second slit pattern 512f is formed, and a third bent portion 523f is formed in a position at which a third slit pattern 513f is formed. Another, fourth, bent portion 524f may be formed by a convex portion 530f and a concave portion 540f.

Here, as in the first and fifth embodiments, the second slit pattern 512f of the second column 502f is formed between the adjacent first slit patterns 511f of the first column 501f, and the third slit pattern 513f of the third column 503f is formed between adjacent second slit pattern 512f of the second column 502f. Thus, the first slit pattern 511c and the first bent portion 521f are displaced from adjacent second slit pattern 512f and the second bent portion 522f.

In a core element according to a sixth embodiment, as in the first to third embodiments, the first end portion (Qf1) is formed with the convex portion 530f and the second end portion Qf2 is formed with the concave portion 540f corresponding to the convex portion 530f.

Thereafter, the core element is rolled up in a tubular shape, and the core element 500f is provided with a fourth slit pattern 514f and a fourth bent portion 524f.

Unlike in previous embodiments, the core element 500f according to a sixth embodiment further includes the concave portion 525a formed in the bent portion 520f.

Referring to FIG. 4C, when the core element 500f is rolled up in tubular shape, the concave portion 525a protrudes toward an inner side which is the center direction of the core element 500f.

When a cylindrical secondary electrode 100 is assembled, since such a structure of the concave portion 525a protrudes toward an inner side of the core element 500f, it does not contact with the electrode assembly and does not affect the electrode assembly 200.

However, when the cylindrical electrode 100 is impacted or compressed, since the concave portion 525a provided in the bent portion together with the bent portion 520f protrudes, a function of the bent portion 520f which destroys a portion adjacent to the core element 500 can be improved.

In addition, when a portion of the bent portion 520f or the bent 520f is compressed, the concave portion protrudes to substitute for the function of the bent portion.

Here, as shown in FIG. 4C, the concave portion 525a may have a hemispherical shape, but the shape of the concave portion 525a is not limited thereto.

Figure 5A:
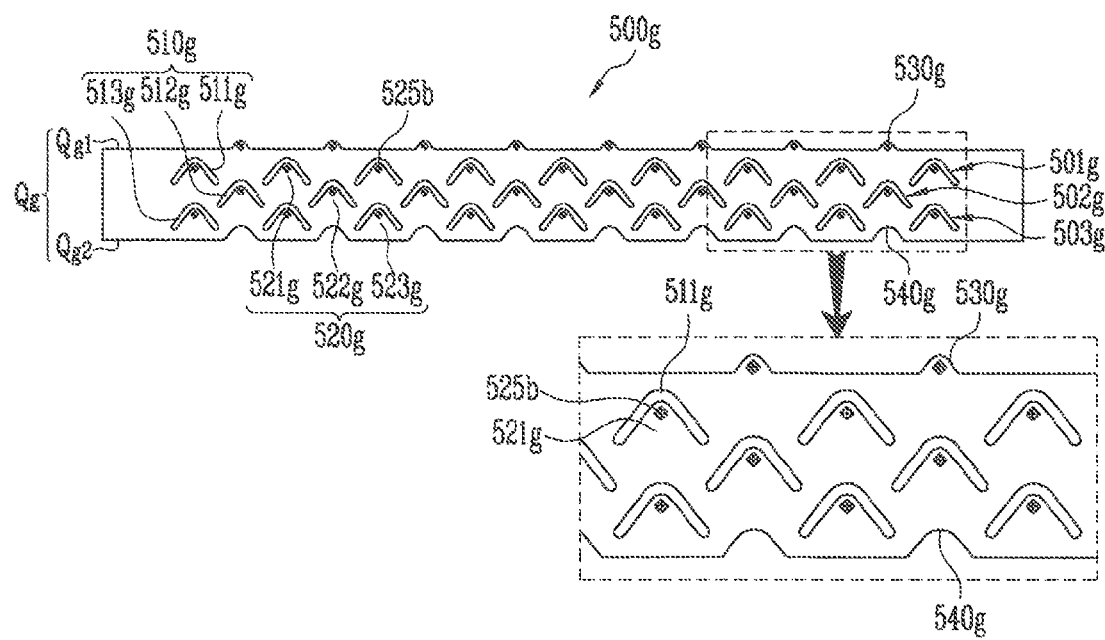
FIG. 5A is a plan view showing a core member according to a seventh embodiment of the present invention.
Figure 5B:
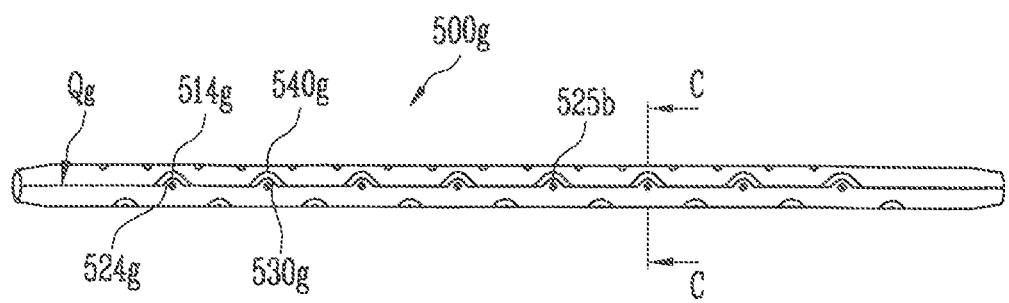
FIG. 5B is a perspective view forming a core in a tubular shape of FIG. 5A.

FIG. 5A is a plan view showing a core element according to a seventh embodiment of the present invention. FIG. 5B is a perspective view showing a core element as a tubular shape, and FIG. 5C is cross-sectional view according to C-C of FIG. 5B.

Figure 5C:
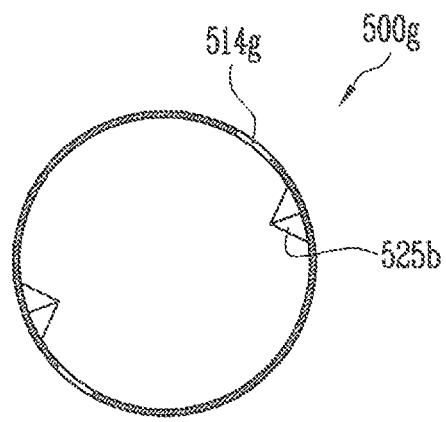
FIG. 5C is a cross-sectional view taken along line C-C.

Referring to FIGS. 5A to 5C, a slit pattern 510g according to a seventh embodiment of the present invention includes a 4-slit pattern, that is, a first slit pattern 511g arranged in a first column 501g along a first direction d1 of the core element 500g, a second slit pattern 512g neighbor on the first slit pattern 511g and arranged in a second column 502g keeping a predetermined interval, a third slit pattern 513g arranged in third column 503g, and others (not shown) formed by a concave portion 540g and convex portion 530g based on a seam Qa as the slit pattern 510 is formed based on the seam Q of FIG. 2B.

As described above, as the slit pattern 510g is formed, the first bent portion 521g is formed in a position at which a first slit pattern 511g is formed, a second bent portion 522g is formed in a position at which a second slit pattern 512g is formed, and a third bent portion 523g is formed in a position at which a third pattern 513g is formed. Another bent portion 524g may be formed by a convex portion 530g and a concave portion 540g.

Here, as in the first and fifth embodiments, the second slit pattern 512g of the second column 502g is formed between the neighbor of first slit pattern 511g on a first column 501g, a third slit pattern 513g of a third column 503g is formed between the neighbor of second slit pattern 512g on a second column 502g, the first slit pattern 511g and a bent portion 521g are displaced from an adjacent second slit pattern 512g and a second bent portion 522g, and a third slit pattern 513g and third bent portion 523g are displaced from an adjacent second slit pattern 512g and a second bent portion 522g.

In a core element 500g according to a seventh embodiment, as with the third and sixth embodiments, the first end portion Qg1 is formed with the convex portion 530g, and the second end portion Qg2 is formed with the concave portion 540g corresponding to the convex portion 530g.

Thereafter, the core element is rolled up in a tubular shape. The core element 500g is provided with a fourth slit pattern 514g and a fourth bent portion 524g.

Unlike the first to fifth embodiments, the core element 500g according to the seventh embodiment further includes the concave portion 525b formed at bent portion 520g. Referring to FIG. 5C, when the core element 500g is rolled up in a tubular shape, the concave portion 525b protrudes toward an inner side of the center direction of the core element 500g. The concave portion 525b of the structure protrudes toward the inner side of the core element 520g and is not in contact with the electrode assembly 200 when the cylindrical secondary electrode 100 is assembled.

Therefore, the concave portion does not have an effect on the cylindrical secondary assembly 200. However, when the cylindrical secondary electrode 100 is impacted or compressed, the concave portion 525b provided in the bent portion 520g protrudes.

Therefore, the function of the bent portion 520g for puncturing a portion adjacent to the core element 500 can be improved. In addition, even if the bent portion 520g or a portion of the bent portion 520g is compressed, the concave portion 525b protrudes to substitute for the function of the bent portion 520g. Here, as shown in FIG. 5C, the concave portion 525b is a quadrangular pyramid shape, but the concave portion 525b is not limited thereto.

If, as in the seventh embodiment, the concave portion 525b is of a quadrangular pyramid shape, the function for puncturing a portion adjacent to the core element 500 can be improved compared with the sixth embodiment.

Figure 6A:
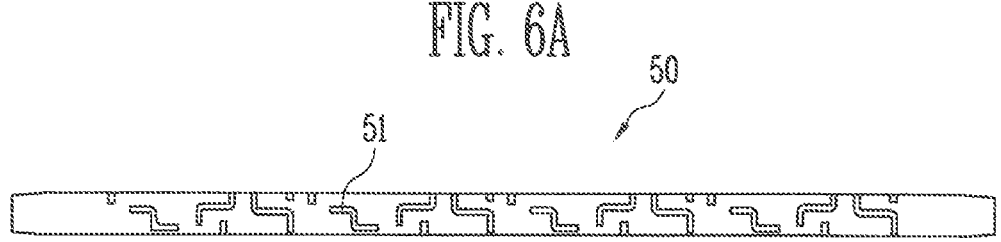
FIGS. 6A and 6B are perspective views of when a core member is impacted according to a comparative example and an embodiment.
Figure 6B:
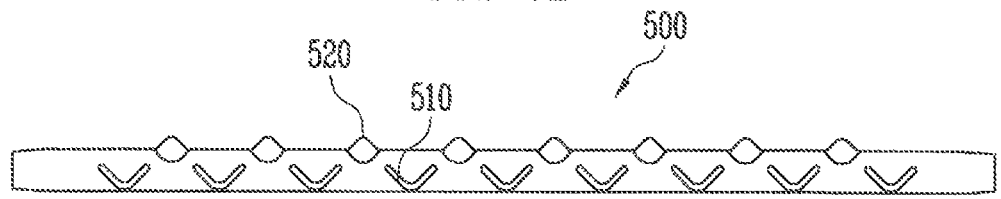

FIGS. 6A and 6B are perspective views of when an impact is applied to the core element according to a comparative example and embodiments of the present invention.

Referring to FIG. 6A, conventionally, when the electrode assembly is compressed in a circumferential direction perpendicular to a longitudinal direction of the core element, the core element 50 is deformed while the core element of the electrode assembly is compressed. In this case, an angled portion protrudes to create an internal short of the electrode assembly. In this case, two conditions should be satisfied to cause the internal short: the angled portion causing an internal short must maintain the protruding condition, and a compressive force must be present to puncture the core portion of the electrode assembly by the angled portion.

However, if the compression force which compresses the core element 50 is applied, it is difficult for the angled portion 51 to withstand the compressive force.

Therefore, the core element 50 shows the entire deformation characteristics before the core element of the electrode assembly is punctured by the angled portion 51.

Since a direction of the compressive force deforming the core element 50 is identical or similar to a protrusion direction of the angled portion 51 causing the internal short, the angled portion 51 cannot withstand the compressive force of a magnitude causing the deformation of the core element 50 to be compressed, making it difficult for the object causing the internal short to puncture the core element of the electrode assembly.

Referring to FIG. 6, the core element 500 according to an embodiment of the present invention forms the slit pattern 510 so that the protruding direction of the bent portion 520 is maintained perpendicular to a direction of pressure or compressive force, or close to the same, and may be controlled to be within the range which destroys a length along which the bent portion 520 protrudes or a portion adjacent to the core element 500 of the electrode assembly 200.

Therefore, even if the magnitude of the compressive force is very large, an internal short may occur prior to an explosion while keeping a sharp portion which punctures the portion adjacent to the core element 500 of the electrode assembly, thereby ensuring the safety of the cylindrical secondary electrode 100.

Therefore, according to an embodiment of the present invention, when pressure is applied to the electrode assembly by an external impact, safety of the cylindrical secondary electrode can be improved by forming a bent portion causing an internal short of the electrode assembly core element.

As described above, the present invention provides improved safety of a cylindrical secondary electrode by forming a bent portion causing an internal short of the electrode assembly when the pressure caused by an external impact is applied.

In addition, the present invention may provide an improved function of a bent portion which punctures a portion adjacent to a core element by forming a concave portion to the bend capable of causing an internal short of an electrode assembly.

In addition, the present invention can improve the function of a bent portion which punctures a portion adjacent to the core element by forming a concave portion to the bent portion causing the external short of the electrode assembly.

As those skilled in the art would realize, the described embodiments may be modified in various different ways, all without departing from the spirit or scope of the present invention.

What is claimed is:

1. A secondary battery, comprising:
   a core element having a bore defining a longitudinal axis surrounded by a peripheral surface perforated by an arrayed plurality of slit patterns, each said slit pattern being bent into a V shape or a U shape to protrude outward forming a protruded bent portion; and
   an electrode assembly formed wound around said peripheral surface of said core element coaxially with said longitudinal axis, wherein
   said slit patterns are arranged in the longitudinal axis of the bore of the core element; and
   the protruded bent portion faces a direction being perpendicular to the longitudinal axis of the bore of the core element, wherein
      the protruded bent portion protrudes in a direction perpendicular to a direction of a pressure or compressive force when the pressure or compressive is applied to the core element; and
      concave portions are formed in the protruded bent portions of the slit patterns and protrude toward an inner side of the core element.

2. The secondary battery of claim 1, wherein the protruded bent portion has a concave shape with a concavity facing a direction being perpendicular to the longitudinal axis of the bore of the core element.

3. The cylindrical secondary battery of claim 1, wherein the length of the slits measured from the uppermost portion to the lowest portion is in the range of about 1 mm to about 2 mm.

4. The cylindrical secondary battery of claim 1, wherein the length of the slits measured from the uppermost portion to the lowest portion is in the range of about 120% to about 140% of the distance between the electrode assembly and the core element.

5. The cylindrical secondary battery of claim 1 comprising at least two rows of slits spaced at generally regular intervals, wherein the slits in successive rows are disposed in a staggered pattern.

6. The cylindrical secondary battery of claim 1 comprising at least two rows of slits spaced at generally regular intervals with the slits in each successive row being disposed directly under each other in generally regular columns.

7. The cylindrical secondary battery of claim 1 comprising at least two rows of slits spaced at generally regular intervals, wherein the slits in each successive row are disposed in a staggered pattern and are oriented 180° with respect to the slits in each adjoining row.

8. The cylindrical secondary battery of claim 1 comprising at least two rows of slits spaced at generally regular intervals, wherein the slits in each successive row are arranged directly under each other in generally regular columns, and wherein the slits in each successive column are oriented 180° with respect to the slits in each adjoining column.

9. The cylindrical secondary battery of claim 1, wherein the core element is disposed at the center of the electrode assembly.

10. The cylindrical secondary battery of claim 1, wherein the core element has a circular cross-section and a rod shape.

11. The cylindrical secondary battery of claim 10, wherein the core element has a bent portion.

12. The cylindrical secondary battery of claim 1, wherein the core element is about 90% to about 110% of the height of the electrode assembly.

13. The secondary battery of claim 1, wherein the core element is roundly rolled to be tubular based on a seam.

14. The secondary battery of claim 13, the core element comprising a first end portion, and a second end portion based on the seam, wherein the first end portion has a convex shape and the second end portion has a concave shape.

15. The secondary battery of claim 2, wherein the concave shape is multi-staged.

16. The secondary battery of claim 1, the concave portion has a hemispherical shape or cone shape.

17. The secondary battery of claim 1, wherein the protruded bent portion has a hemispherical shape, a half elliptic shape or a V shape.

* * * * *